United States Patent [19]

Bois et al.

[11] 4,149,730
[45] Apr. 17, 1979

[54] TANGENTIAL PICK-UP DEVICE FOR A GRAMOPHONE TURN-TABLE

[76] Inventors: Daniel Bois, Chouilly, Geneva, Switzerland, CH-1242; Jan Olsfors, Route de Divonne, 18, Nyon, Vaud, Switzerland, CH-1260

[21] Appl. No.: 788,890

[22] Filed: Apr. 19, 1977

[30] Foreign Application Priority Data

Apr. 27, 1976 [CH] Switzerland .................... 5264/76

[51] Int. Cl.² ............................................... G11B 3/38
[52] U.S. Cl. .................................................. 274/23 A
[58] Field of Search ............... 274/23 A, 23 R, 13 R, 274/14, 15

[56] References Cited

U.S. PATENT DOCUMENTS

| 2,566,091 | 8/1951 | Masterson | 274/23 A |
|---|---|---|---|
| 2,905,475 | 9/1959 | Cheeseboro | 274/23 A |
| 3,622,163 | 11/1971 | Bachman | 274/23 A |
| 3,675,932 | 7/1972 | Rabinow | 274/23 A |
| 3,734,511 | 5/1973 | Rabinow | 274/23 R |
| 3,873,762 | 3/1975 | Taylor | 274/23 A |

FOREIGN PATENT DOCUMENTS 2419139 11/1974 Fed. Rep. of Germany ........ 274/23 R

*Primary Examiner*—Richard E. Aegerter
*Assistant Examiner*—John W. Shepperd
*Attorney, Agent, or Firm*—Emory L. Groff, Jr.

[57] ABSTRACT

A tangential pick-up device for a gramophone turn-table comprises a pick-up head on a support connected by a floating articulation to a carriage which is driven along a radially-disposed arm by a servo-control device to hold the support in a reference position. The floating articulation of the support, e.g. by flexible suspension wires, is arranged so that shocks or vibrations tend to cause pivoting of the support about two axes disposed radial and perpendicular to a disc and intersecting adjacent the pick-up needle, whereby jumping of the needle is avoided.

2 Claims, 17 Drawing Figures

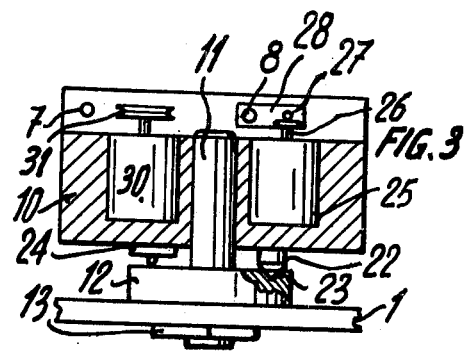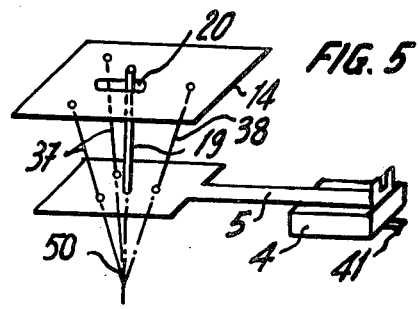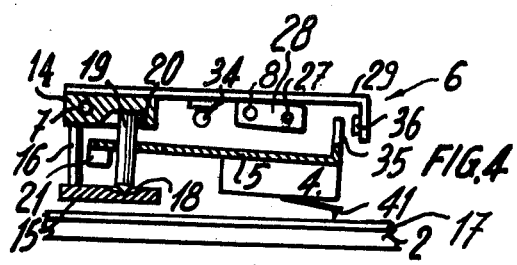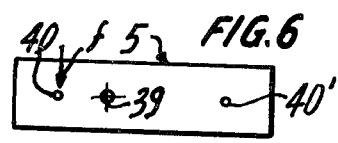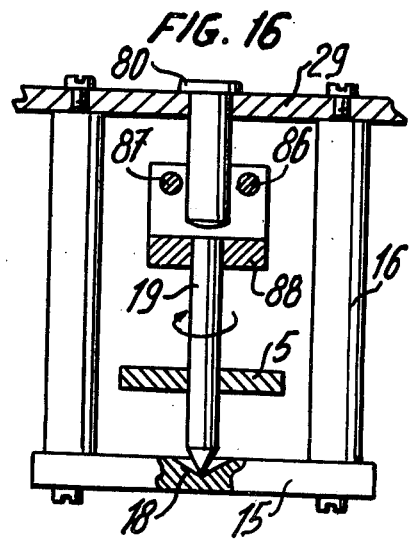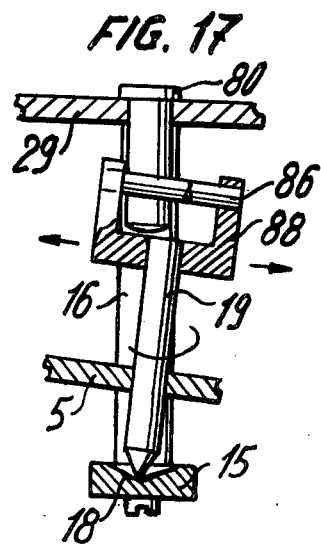

TANGENTIAL PICK-UP DEVICE FOR A GRAMOPHONE TURN-TABLE

The invention relates to pick-up devices for gramophone turn-tables.

There are known tangential pick-up devices comprising a pick-up head mounted on a support articulated on a carriage, said carriage being movable along at least one rectilinear guide parallel to a radius of playing a disc passing through the geometrical location of a needle of the pick-up head during playing of a disc, a device supplying a quantity representing the position of the support in relation to the carriage, and a servomotor controlling displacements of the carriage as a function of said signal in a manner to maintain said position in the vicinity of a reference position.

Turn-tables with pick-up devices of this type are advantageous since the needle of the pick-up head moves along a path radial to the disc and remains substantially tangential to the groove during the entire playing of the disc, which limits the forces exerted by the needle on the sides of the groove and ensures a perfect constancy of the playing conditions.

It is also known that to reduce as far as possible the wear of discs, it is advisable to provide a very low needle pressure. This is usually obtained by providing the pick-up head with a counter-weight. If there is an overcompensation of the needle pressure, there is however the drawback that very slight shocks, trembling or vibrations, or slight faults of planarity or centering of the disc, suffice to make the needle of the pick-up head jump out of the groove.

The object of the present invention is to reduce to a great extent the occurence of this defect and to enable needle pressures far less than one gram to be achieved without this defect appearing, while making a pick-up device extremely insensitive to shocks and to faults in the planarity and centering of discs, as well as having great facility of manipulation excluding any possibility of jumping of the needle of the pick-up head out of the groove.

To this end, a pick-up device according to the invention is characterized in that:

(a) the length of said support perpendicular to the playing radius is less than the disc radius;

(b) the support is articulated to the carriage by coupling elements at least one of which has a floating point of articulation which is able to become a determined point of articulation by the application of a biasing force on the coupling element or elements in question;

(c) said coupling elements are disposed so that under the action of said biasing force, they limit displacement of the support to two pivoting movements about two axes, a first axis parallel to the rectilinear guide and a second axis contained in a plane which is secant to the first axis, said second axis being transverse to the plane of the disc;

(d) said biasing force is situated in a plane containing the second axis; and (e) the distance between the second axis and the center of gravity of the support with the parts attached thereto is less than the distance between said center of gravity and the needle of the pick-up head.

The accompanying drawings show, schematically and by way of example, several embodiments of the invention. In the drawings:

FIGS. 3 and 4 are cross-sections respectively along lines III—III and IV—IV of FIG. 2;

FIG. 5 illustrates a variation of a pivoting device for a support of a pick-up head;

FIG. 6 is an explanatory diagram;

FIGS. 16 and 17 show a varied form of the articulation device of the pick-up head visible in FIG. 4.

Figure 1:
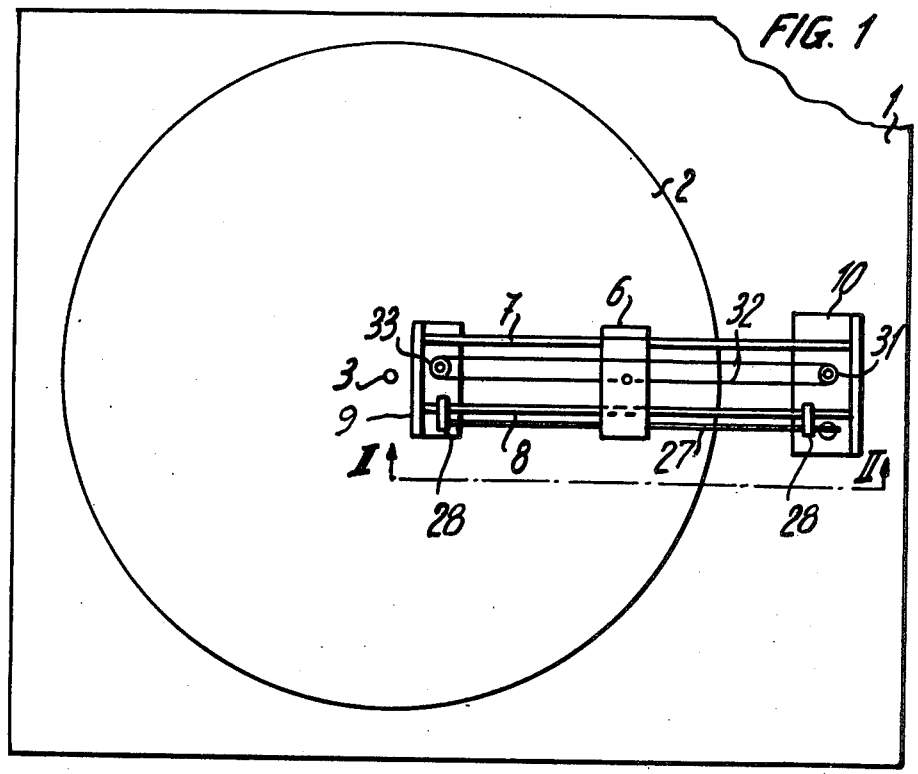
FIG. 1 is a plan view of a first embodiment.
Figure 2:
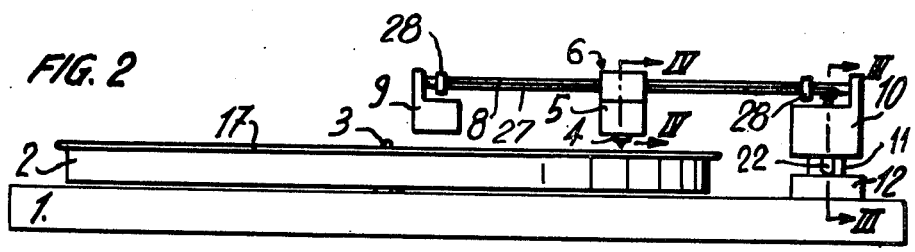
FIG. 2 is an elevational view along line II—II of FIG. 1.

The gramophone turn-table shown in FIGS. 1 and 2 comprises a plate 1 on which is mounted a rotary disc-carrying table 2 carried by a pivot 3. A pick-up head 4 is fixed to a support 5 which is articulated about a generally vertical axis on a carriage 6. The carriage 6 is movable along a guide formed by a rod 7 extending parallel to the plane of table 2. The rod 7 forms, with another parallel rod 8, an arm which includes two end blocks 9 and 10.

In FIGS. 1 and 2, this arm is shown in a reading position in which it extends radially in relation to the table 2; its end formed by the block 9 is free and is located close to the center of table 2. Its other end is formed by the block 10 which pivots about a vertical axis on a tube 11 fixed on a block 12. This vertical pivot is fixed on the plate 1 by a nut 13 as shown in FIG. 3.

FIG. 4 shows on a larger scale an articulation device between the support 5 of the pick-up head 4 and the carriage 6. The carriage 6 comprises an upper block 14 slidably mounted on the rod 7 and a plate 15 connected by struts 16 to the block 14. The plate 15 is very close to the upper surface of a disc 17 placed on the table 2 and has a shallow conical recess 18 receiving a conical pointed end of a pivot 19. The upper end of pivot 19 is engaged in a slot 20 of the block 14. The support 5 is carried by pivot 19 whereby it may pivot about a generally vertical axis, i.e. perpendicular to the table 2, and tip about the point of pivot 19 about an axis parallel to the plane of table 2 and to the rod 7.

The distance between the vertical axis passing through the pivot 19 and the needle of the pick-up head 4 is very small in relation to the radius of table 2. As a result, the support 5 carrying the head 4 and a counter-weight 21 has only a slight moment of inertia about its horizontal tipping axis parallel to the rod 7 and about its vertical axis. Hence, the support 5 may follow all of the vertical and radial movements which may be due either to vibrating, or to a defect in the planarity or centering of a disc, without however jumping out of the groove.

Referring particularly to FIG. 3, the tube 11, which is perpendicular to the plane of the plate 1 and projects from the surface thereof, enables the pick-up arm to be pivoted to free the surface of the table 2, to facilitate the placing and removal of discs. The disc playing position is provided by a thrust abutment formed by a conical head 22 which engages under the weight of the arm, in a conical recess 23 of block 12.

In this position of the arm, a micro-switch 24 carried by the block 10 cooperates with the block 12 to lower the pick-up head 4. To this end, this switch 24 cuts off the supply of an electro-magnet 25 whose mobile armature 26 is then free to upwardly urge, under the action of a biasing spring not shown, a rod 27 parallel to the rod 8 and pivoted thereon by two arms 28. When the rod 27 occupies its raised position, it lifts up a plate 29 (FIG. 4) forming part of the carriage 6. The carriage 6 thus pivots about the rod 7 and, as the slot 20 has only a limited length, drives the support 5 and the head 4 to move the needle 41 away from the disc.

It is advantageous to provide a friction fit between the arms 28 and the rod 8 so that when the electro-magnet 25 is energized, its mobile armature 26 moves down rapidly, but is followed slowly by the rod 27. In this manner, the lowering movement of the pick-up head 4 onto the disc is very gentle. To the contrary, lifting up of the head 4 takes place rapidly, which is advantageous when the user pivots the arm during playing of a disc. This pivoting cuts off the supply of the electro-magnet 25 by the switch 24, and the pick-up head 4 is immediately lifted up, which avoids any damage to the disc.

During the playing of a disc, the carriage 6 must accompany the playing head 4 as it moves towards the center of the disc. This is obtained by means of a servo-motor 30 (FIG. 3) carrying a pulley 31 driving a flexible band 32 passing about a guide pulley 33 (FIG. 1). The motor 30 is controlled by the variations of the position of the support 5 in relation to carriage 6. For this purpose, a light beam from a lamp 34 (FIG. 4) and passing through a slot 35 in support 5 of the carriage 6 impinges to a greater or lesser degree, depending on the alignment of slot 35 with the beam of light, on two photoconductors 36 which pilot, by an electric circuit, not shown, but known per se, the driving of motor 30 in the appropriate direction to provide the same quantity of light on the two photoconductors 36. Hence, during playing, the position of the support 5 in relation to the carriage 6 is automatically maintained in the vicinity of a reference position.

As shown in FIG. 4, the horizontal tipping axis of the pick-up head 4 is very close to the upper surface of the disc. By an appropriate articulation device, it is possible to arrange that this axis is virtually situated in the plane of the face of the disc. FIG. 5 shows such a device in which the support 5 is suspended from the block 14 by oblique wires 37 and 38. The intersection 50 of the extensions of these wires gives the position of the virtual center of pivoting for small amplitudes. Of course, it is necessary to provide several wires 37 and/or 38 non-parallel to one another, but in a common plane to avoid the support 5 being able to move in a direction perpendicular to the plane of FIG. 5.

Normally, the center of gravity of the support 5 with the parts attached thereto is very close to its vertical pivoting axis, in such a manner that a radial shock on the table does not tend to pivot the support 5 about this axis and hence make the needle jump out of the groove of the disc.

FIG. 6 shows another advantageous arrangement in the case where the amplitude of said radial shocks is low. The support 5 is schematically shown in plan, 39 indicating its center of gravity taking into account all of the masses fixed therewith. Also shown by two points are two vertical axes one of which, 40, is the axis of pivoting about the pivot 19 and the other of which passes through the needle 41 of the pick-up head 4. If the assembly is given an impulsion of force in the direction of arrow f, as a result there is a displacement of the center of gravity 39 in the same direction. Moreover, this impulsion will also tend to pivot the support 5 in the counter-clockwise direction in FIG. 6, because of its inertia. By choosing the distances of the two axes 40 and 41 from the center of gravity 39 and the moment of inertia of the support 5 about a vertical axis passing through the center of gravity 39, it is possible to arrange that the instantaneous axis of rotation of the assembly coincides substantially with the axis 40′ passing through the needle. This condition is fulfilled when the product of said two distances and the mass of the assembly is equal to the moment of inertia about the vertical axis passing through the center of gravity 39. The latter arrangement entirely prevents the accelerations of the carriage 6 due to the operation of the servo-motor 30 from producing lateral forces urging the needle 41 against the faces of the groove and altering the quality of the reproduction.

Figure 7:
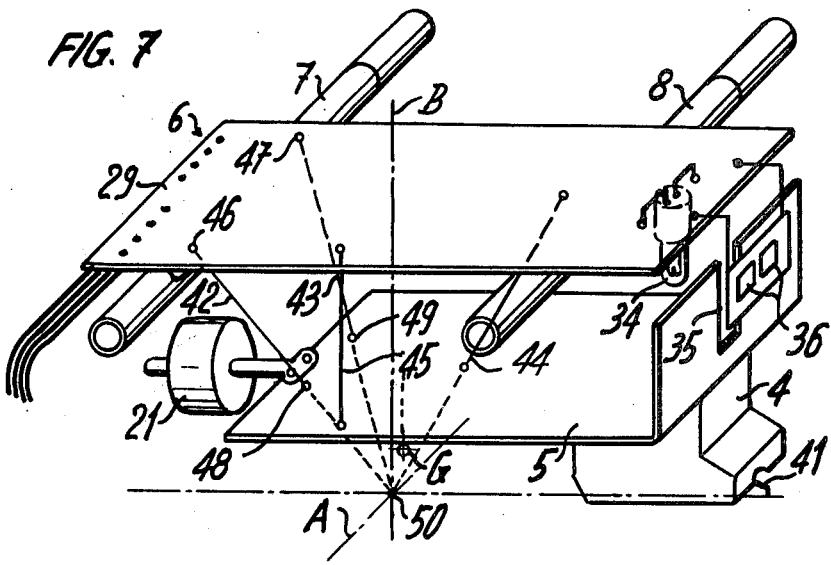
FIG. 7 is a perspective view of a second embodiment.
Figure 8:
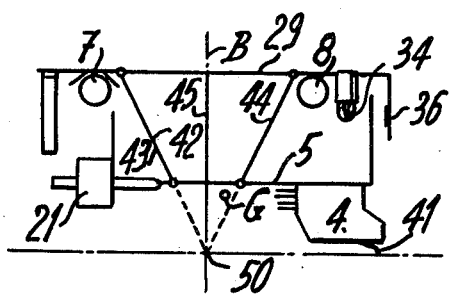
FIG. 8 is a side view of the second embodiment.
Figure 9:
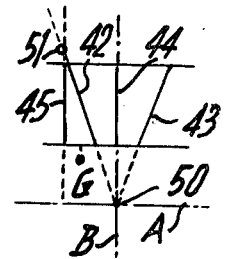
FIG. 9 shows a projection of wires of the second embodiment onto a plane.

In the second embodiment, shown in FIGS. 7 to 9, the carriage 6 comprises a plate 29 slidably mounted on the two rods 7 and 8. This plate 29 carries the lamp 34 which illuminates photodiodes 36 through slot 35. The support 5 is formed by a bent plate carrying the counter-weight 21.

The coupling between the plate 29 of carriage 6 and support 5 is provided by four flexible wires 42, 43, 44 and 45 which are held taut by the weight of the suspended assembly, i.e. the head 4, support 5 and counter-weight 21. These flexible wires may for example be brass or copper-beryllium wires of 0.05 mm diameter; they have a practically negligible elastic resistance to flexion and buckling, so that the support 5 is perfectly freely articulated to the carriage without any friction.

The two wires 42 and 43 connect two points 46, 47 of the carriage 6 to two points 48, 49 of the support 5 disposed so that these four points are in a plane passing through a virtual axis A which is parallel to the plane of the disc. It can be seen that the directions of wires 42 and 43 intersect at 50 on the axis A.

The second axis of pivoting of the support 5 is designated by B. In the illustrated example, axis B cuts axis A at point 50 and is perpendicular to the plane of the disc. The direction of wire 44 also passes through point 50.

The wire 45 is parallel to the axis B; in other words, it intersects axis B at infinity.

Hence, the directions of the four wires 42 to 45 cut the first axis A and the second axis B. Moreover, when the directions of these wires are projected onto a plane parallel to axes A and B, they cut in at least two distinct points 50 and 51, as shown in FIG. 9.

The biasing force which maintains the four wires 42 to 45 taut is produced by the weight of the assembly of the support 5 with the counterweight 21 and the pick-up head 4. This force is applied at the center of gravity G of this assembly which is situated in front of the axis A and asymetrically between two planes perpendicular to the axis A, one passing through the wire 45 and the second through the axis B.

Figure 10:
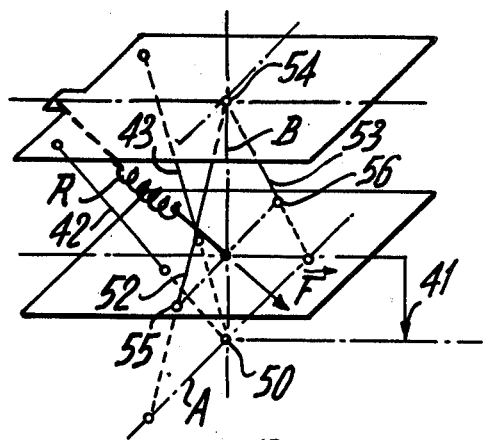
FIGS. 10 and 11 are schematic perspective and face views showing an arrangement of flexible wires of a third embodiment.

FIG. 10 shows another embodiment in which the assembly of the support 5 and the carriage 6 is entirely symmetrical in relation to the plane which is perpendicular to the axis A and which passes through the axis B. Two flexible wires 52, 53 connect one and the same point 54 of the carriage 6 to two symmetrically disposed points 55, 56 of the support 5. These two wires 52, 53 are disposed in a plane parallel to the first axis A and passing through the second axis B. The two other wires are designated by 42 and 43, as they are disposed in the same manner as the wires 42, 43 of the embodiment of FIGS. 7 to 9.

The four wires are kept tautened by the biasing force applied obliquely on the support 5 by a spring R which also bears against the carriage 6 at a point of the axis B above the axis A. Thus the support 5 is free of reacting torque when turning around axis B and is subjected to a resilient torque around axis A to maintain the needle 41 in the groove of the disc.

Figure 11:
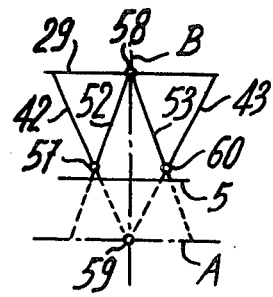

FIG. 11 shows that the arrangement of wires of FIG. 10 gives in projection on a plane parallel to the axes A and B, four points of intersection 57, 58, 59, 60. The counterweight is adjusted so that the center of gravity of the support assembly is situated on the axis B, so that accelerations communicated to the turn-table in a plane parallel to the plane of the disc are transmitted to the support without generating any dynamic force of reaction on the edges of the groove of a disc being played.

Figure 12:
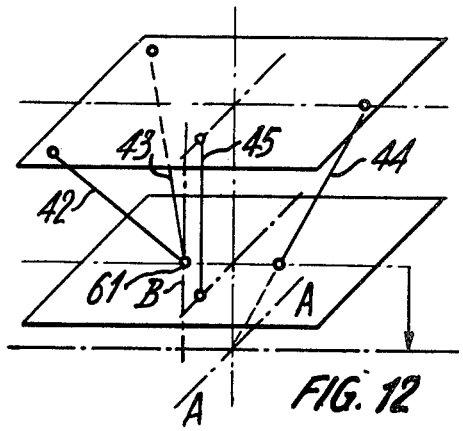
FIGS. 12 and 13 are views similar to the preceding ones, of a fourth embodiment.
Figure 13:
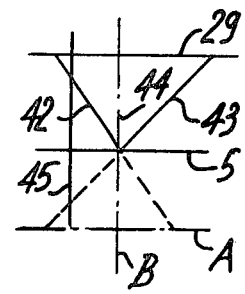

The embodiment according to FIGS. 12 and 13 is very close to that illustrated in FIGS. 7 to 9, with the difference that the directions of the wires 42 and 43 meet at 61 above their respective points of intersection with the axis A. As a result, the axis B, which passes through point 61 and is parallel to the wire 45, does not cut the axis A.

Figure 14:
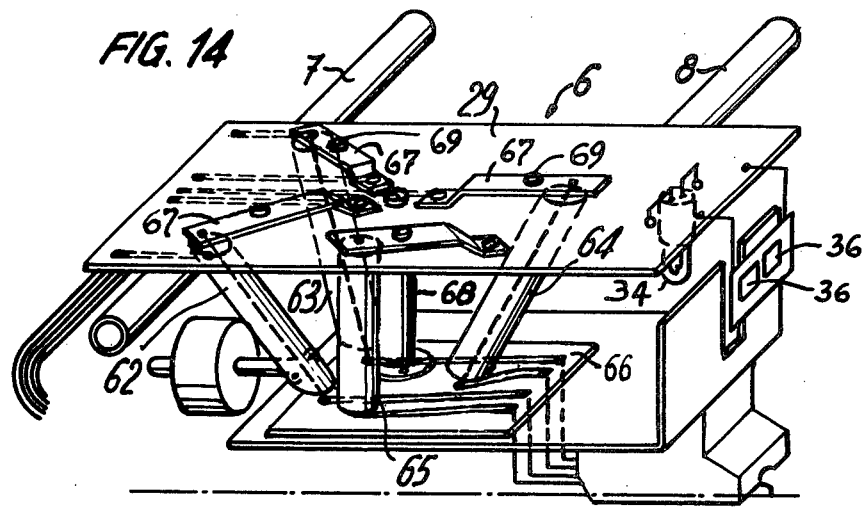
FIG. 14 is a perspective view of a fifth embodiment.
Figure 15:
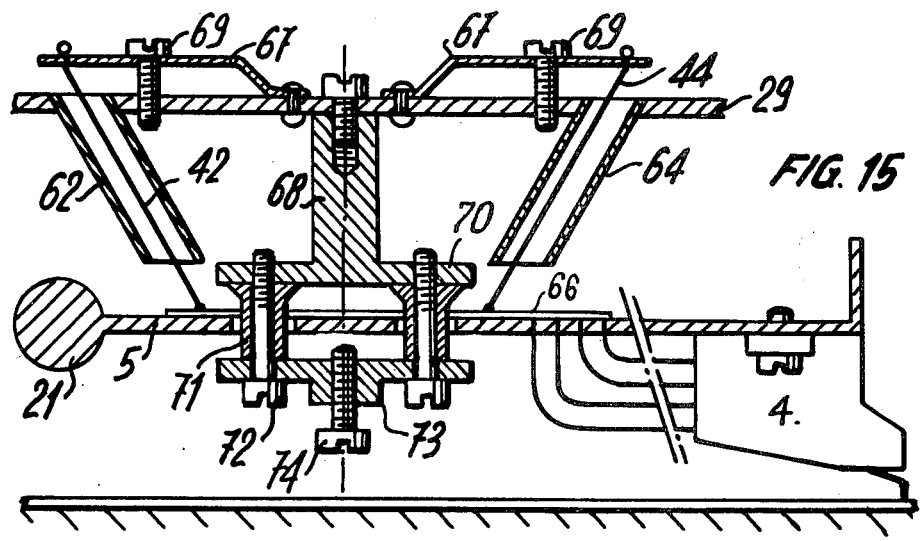
FIG. 15 is vertical cross-section of the fifth embodiment, along a plane tangential to a playing groove.

The embodiment according to FIGS. 14 and 15 has the same disposition of flexible wires as the device of FIGS. 7 to 9, but is provided with a protection means to avoid a risk of rupture of the flexible wires during transport of the device. In effect, when a turn-table is transported, it may be subjected to much greater shocks and vibrations than when it is in normal use.

For this purpose, four tubes 62, 63, 64 and 65 are rigidly fixed on the plate 29 of carriage 6 along the directions of respective wires 42 to 45. At their ends remote from the plate 29, the tubes terminate at a slight distance from a printed circuit plate fixed to the support 5.

Each wire 42 to 45 passes with play in a respective tube. The lower end of each wire is fixed to the aforesaid printed circuit plate of support 5. In this manner, the wires are connected to the terminals of pick-up head 4 and serve as conducting leads to transmit the audio signals supplied by the pick-up head 4 to amplifying means. Preferably, the tubes 62 to 65 are metallic and each form a screen for the wire 42 to 45 which passes coaxially through it. For a stereophonic head, at least three of the flexible wires form conducting leads.

At their upper ends, the wires are fixed to spring blades 67 fixed on the plate 29 which is of insulating material. Each blade 67 tends to pull up the corresponding wire, to a limit position of the blade defined by the head of a screw 69 freely engaged in a hole of the blades, this head acting as an adjustable stop.

The plate 29 of the carriage 6 also carries a central column 68 extending between the tubes 62 to 65 and whose lower end terminates with a widened portion 70 parallel to the plate 29. Three screws 72 each passing in a tubular spacer 71 are fixed in this widened portion 70 and pass with play through holes in the support 5. In this manner, displacements of the support 5 relative to the plate 29 are limited so as to avoid any exaggerated stressing of the wires 42 to 45 in the event of a shock.

A plate 73 extends under and generally parallel to the support 5 and is gripped between the heads of screws 72 and the spacers 71. This plate 73 has a threaded bore for a screw 74 enabling the support 5 to be locked against the end of column 66 when the apparatus must be transported and hence risks being subjected to important shocks. When the screw 74 is tightened, it raises the support 5 so that the wires 42 to 45 are relaxed and are hence protected from exaggerated stresses.

In the embodiments of FIGS. 7 to 9 and 12 to 15, the biasing force which holds the wires taut is produced solely by the weight of the support 5 with the pick-up head 4 and counterweight 21. However, it is evident that if one wishes to increase the traction exerted on the wires, a compression spring such as R, FIG. 10, could be placed between the plate 29 and support 5.

Such a spring is indispensable when the pick-up is used in a turn-table with which the plane of a played disc is appreciably inclined to horizontal.

FIGS. 16 and 17 illustrate a variation of the articulation shown in FIG. 4 in which, as before, pivot 19 bears by its lower pointed end in a conical recess 18 of plate 15. However, the upper end of pivot 19 is guided by a fixed stud 80 carried by plate 29 and about which is engaged with a slight play a rectilinear guide formed by two parallel rods 86 and 87 mounted on a yoke 88 fitted on the upper end of pivot 19. In this case, even for an inclination such as that shown in FIG. 17, the geometrical axis of pivoting remains fixed and is determined by the bottom of the recess 18 and the axis of stud 80.

The above-described embodiments are based on a conventional turn-table construction whose table has a diameter substantially equal to the maximum diameter of discs which can be played with the apparatus. However, it is clear the the invention may be applied to any turn-table constructions, notably those with which the disc supporting and driving means is formed by a hub of substantially smaller diameter than the discs to be played. Also, the plane of rotation of the disc need not necessarily be horizontal, since the arrangement according to the invention can be adapted for turn-tables with which the disc turns in a vertical plane, or even in an oblique plane.

We claim:

1. In a pick-up device for a phonograph record turn-table comprising a tangentially moving tone arm including a mounting block, at least one rectilinear guide member extending parallel to the radius of a record on said turntable, a servo-motor in said mounting block, a carriage movable along said guide member, a support beneath said carriage, a pickup head at one end of said support, articulation means connecting the other end of said support to said carriage, a device on said carriage supplying an electric signal indicating the position of said support relative to said carriage and said servo-motor controlling the displacement of the carriage in response to said signal, the improvement wherein, said articulation means comprises a pivot member having a conical point at its lower end, a plate member connected to said carriage and having an enlarged conical seat in which said conical point engages, said pivot member extending through said support, a guide block on said carriage having a slot therein in which the upper end of said pivot member is freely movable, whereby said pivot member may move angularly in a plane perpendicular to the surface of and tangential to the grooves of said record and also rotate around a substantially vertical axis of the support, said slot located further away from the surface of the record than said conical point of said pivot member.

2. In a pick-up device for a phonograph record turntable comprising a tangentially moving tone arm including a mounting block, at least one rectilinear guide member extending parallel to the radius of a record on said turntable, a servo-motor in said mounting block, a carriage movable along said guide member, a support beneath said carriage, a pickup head at one end of said support, articulation means connecting the other end of said support to said carriage, a device on said carriage supplying an electric signal indicating the position of said support relative to said carriage and said servo-motor controlling the displacement of the carriage in response to said signal, the improvement wherein, said articulation means comprises a pivot member having a conical point at its lower end, a plate member connected to said carriage and having an enlarged conical seat in which said conical point engages, said pivot member extending through said support, a stud fixed to said carriage and depending therefrom, a yoke mounted on the upper end of said pivot member, a pair of parallel guide members mounted on said yoke, said stud movably engaged between said guide members whereby said pivot member may move angularly in a plane perpendicular to the surface of and tangential to the grooves of said record, and also rotate around a substantially vertical axis of the support, said yoke and guide members located further away from the surface of the record than said conical point of said pivot member.

* * * * *